(12) United States Patent
Chen (10) Patent No.: US 9,146,360 B2
(45) Date of Patent: Sep. 29, 2015

(54) V-GROOVE FERRULE MATING SLEEVE (71) Applicant: Verizon Patent and Licensing Inc., Basking Ridge, NJ (US)

(72) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 122 days.

(21) Appl. No.: 14/023,510

(22) Filed: Sep. 11, 2013

(65) Prior Publication Data

US 2015/0071591 A1 Mar. 12, 2015

(51) Int. Cl.
*G02B 6/36* (2006.01)
*G02B 6/38* (2006.01)

(52) U.S. Cl.
CPC ............ *G02B 6/3825* (2013.01); *G02B 6/3873* (2013.01)

(58) Field of Classification Search
CPC .. G02B 6/3825; G02B 6/3873; G02B 6/3881; Y10T 29/49895; H01S 5/02208
USPC ......................................... 385/70–72, 76–78
See application file for complete search history.

(56) References Cited

U.S. PATENT DOCUMENTS

| | | | | |
|---|---|---|---|---|
| 4,142,776 A | * | 3/1979 | Cherin et al. | 385/71 |
| 4,201,444 A | * | 5/1980 | McCartney et al. | 385/64 |
| 4,562,632 A | * | 1/1986 | Parchet et al. | 29/281.1 |
| 4,657,338 A | * | 4/1987 | Khoe et al. | 385/83 |
| 4,784,456 A | * | 11/1988 | Smith | 385/55 |
| 6,293,708 B1 | * | 9/2001 | Ohtsuka et al. | 385/72 |
| 6,402,390 B1 | * | 6/2002 | Anderson et al. | 385/71 |
| 6,553,173 B1 | * | 4/2003 | Goto | 385/137 |
| 7,331,721 B2 | * | 2/2008 | Dudek et al. | 385/89 |
| 7,811,006 B2 | * | 10/2010 | Milette et al. | 385/76 |
| RE43,542 E | * | 7/2012 | Murray et al. | 385/80 |
| 8,944,702 B2 | * | 2/2015 | Kachmar | 385/83 |
| 2002/0168168 A1 | * | 11/2002 | Iravani | 385/136 |

* cited by examiner

Primary Examiner — Ellen Kim (57) ABSTRACT

A ferrule sleeve includes a sleeve body, where the sleeve body is shaped in a V and includes a V-shaped groove that runs a length of a first side of the sleeve body. The ferrule sleeve further includes a sleeve cover, having a flat, rectangular shape, which fits into an opening of the V-shaped groove of the sleeve body. The ferrule sleeve further includes a cover spring that fits into the opening of the V-shaped groove of the sleeve body adjacent the spring cover, wherein the sleeve cover and the cover spring, when a first cylindrical ferrule is inserted within the V-shaped groove act to hold the first cylindrical ferrule within the V-shaped groove and prevent the first cylindrical ferrule from rotating, or from moving in a longitudinal.

20 Claims, 9 Drawing Sheets

V-GROOVE FERRULE MATING SLEEVE

BACKGROUND

Fiber connectors permit cables that contain optic fibers to be connected with one another via a separable interface that allows for easy disconnection and reconnection of the cables. When fiber connectors are mated with one another, the optic fibers in each cable should be aligned with one another to facilitate optical transmission between the optic fibers. To minimize losses associated with the mated fiber connectors, it is important that the fiber connectors provide accurate fiber alignment (i.e., core-to-core alignment of the fiber media) and that the ferrule end faces of each fiber connector be precisely shaped such that optimum physical contact can be maintained between each mated fiber pair.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

A ferrule sleeve, as described herein, acts as a mating sleeve between two cylindrical ferrules containing optic fibers to provide consistent optical connection performance and alignment of the optic fibers. The ferrule sleeve, according to a first embodiment, includes a V-shaped inner groove that receives fiber optic cable ferrules, and a sleeve cover and a cover spring that snaps into place over the V-shaped groove to retain the cable ferrules in a precise position with respect to one another such that the ferrules don't move in a longitudinal direction within the V-shaped groove, and don't rotate relative to one another. The V-shaped groove of the ferrule sleeve, in conjunction with the sleeve cover and the cover spring, maintains physical contact between end faces of the cable ferrules and maintains accurate optic fiber alignment.

The ferrule sleeve, according to a second embodiment, includes a cylindrical sleeve having key notches at each end of the sleeve that mate with keys located on the ferrules themselves, or located within housings associated with the ferrules and the attached cables that carry the optic fibers. The ferrule sleeve, according to this second embodiment, is formed from a flexible material with an inner diameter slightly smaller than the outer diameter such that the ferrule sleeve maintains a grip upon ferrules inserted within the ferrule sleeve. Upon insertion of the ferrules within the ferrule sleeve and mating of the key notches at each end of the ferrule sleeve with the corresponding keys, the ferrule sleeve is held in rotational position with respect to the ferrules to maintain optic fiber alignment.

Figure 1A:
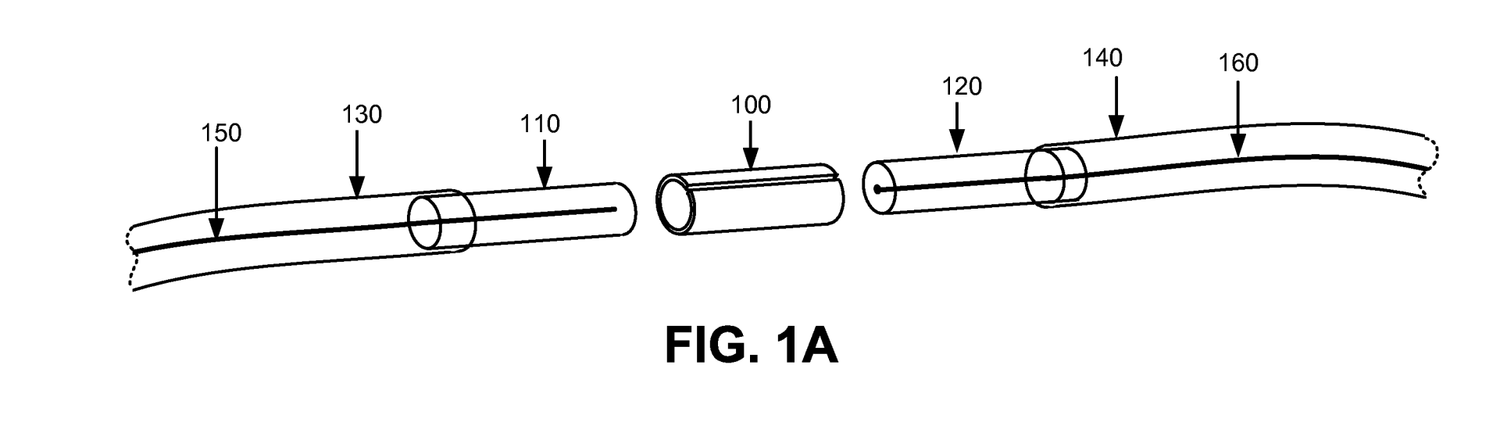
FIGS. 1A and 1B are diagrams that illustrate a cylindrical ferrule sleeve used to mate ferrules associated with optic cables.
Figure 1B:
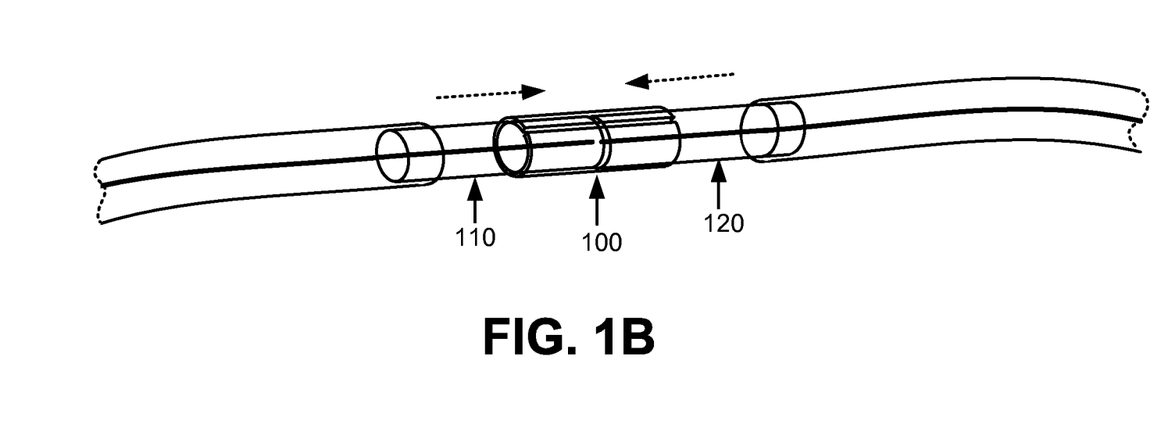

FIG. 1A depicts a cylindrical ferrule mating sleeve 100 that can be used to mate ferrules 110 and 120 associated with two different fiber optic cables 130 and 140 that include optic fibers 150 and 160. Cylindrical ferrule mating sleeve 100 may, for example, be composed of a ceramic or a polymer (e.g., composite polymer) material. As further shown in FIG. 1B, during an installation process by a user, ferrule 110 is inserted into an open end of cylindrical ferrule mating sleeve 100, and ferrule 120 is inserted into another open end of mating sleeve 100. Ferrules 110 and 120 are inserted into mating sleeve 100 until the ferrule faces abut one another and thereby align optic fibers 150 and 160. In the configuration depicted in FIG. 1B, however, mating sleeve 110 may move around relative to ferrules 110 and 120, and ferrules 110 and 120 may slide within mating sleeve 110 relative to one another. Movement of mating sleeve 100 and/or ferrules 110 and 120 may negatively affect the alignment of fiber optics 150 and 160, thereby causing transmission losses (i.e., insertion losses).

Figure 2:
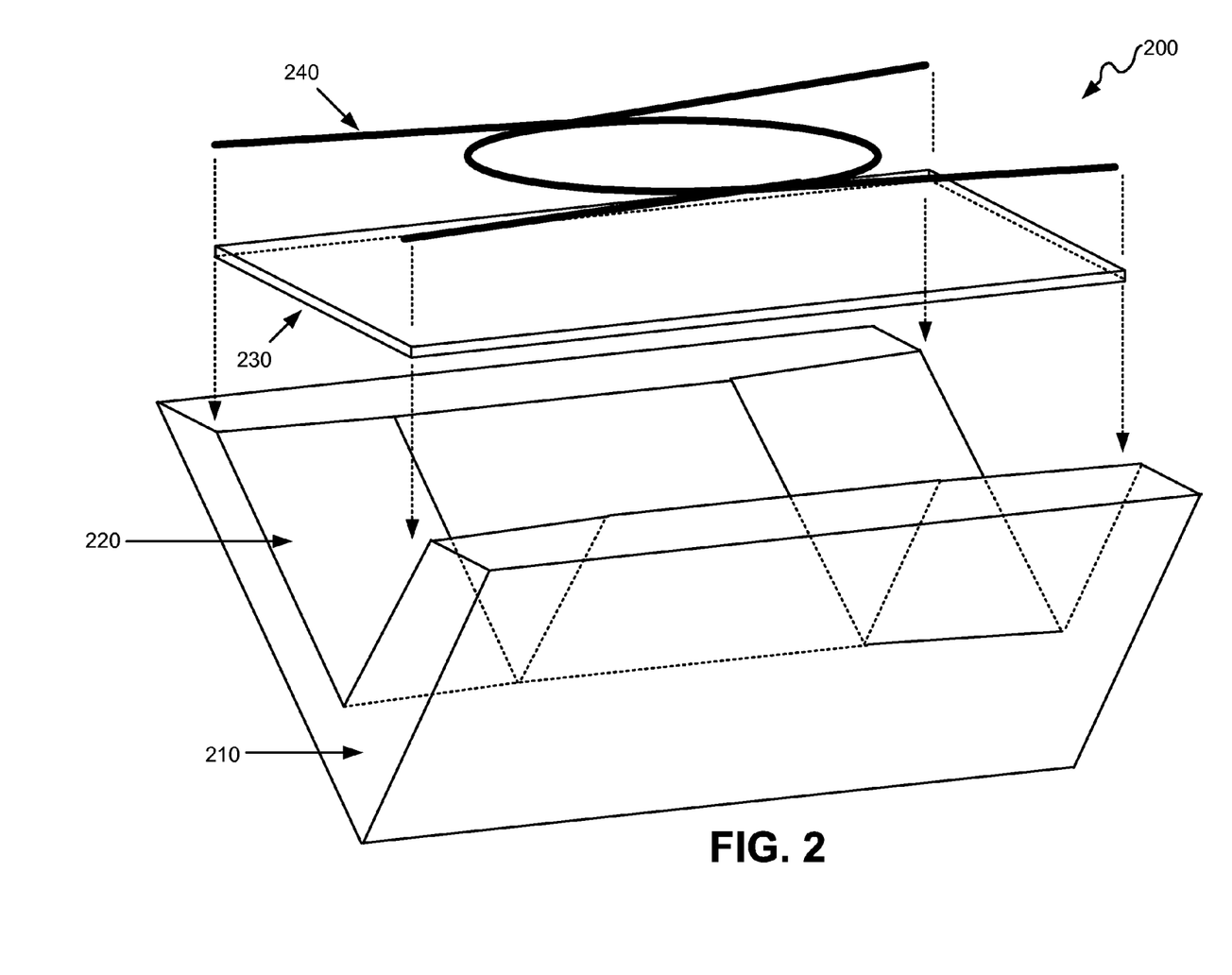
FIG. 2 is a diagram that depicts a three dimensional view of a ferrule sleeve according to a first exemplary embodiment.
Figure 3A:
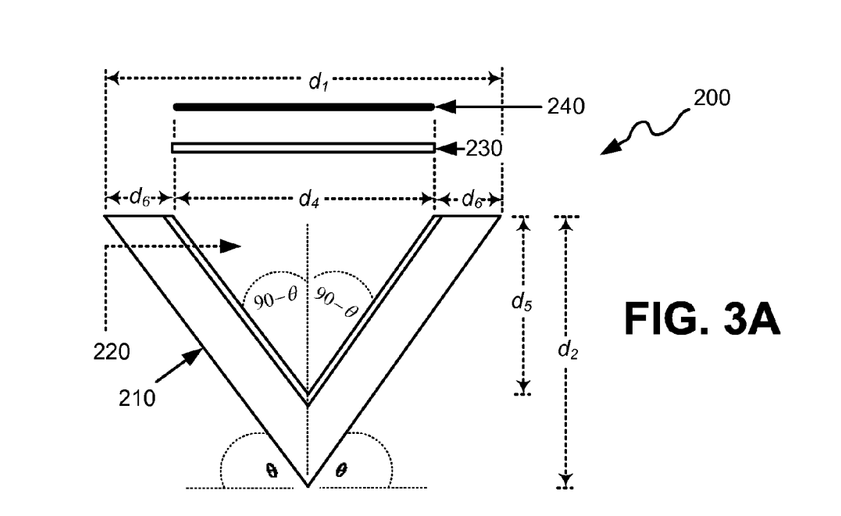
FIG. 3A is a diagram that depicts a view of a face of the ferrule sleeve of FIG. 2.
Figure 3B:
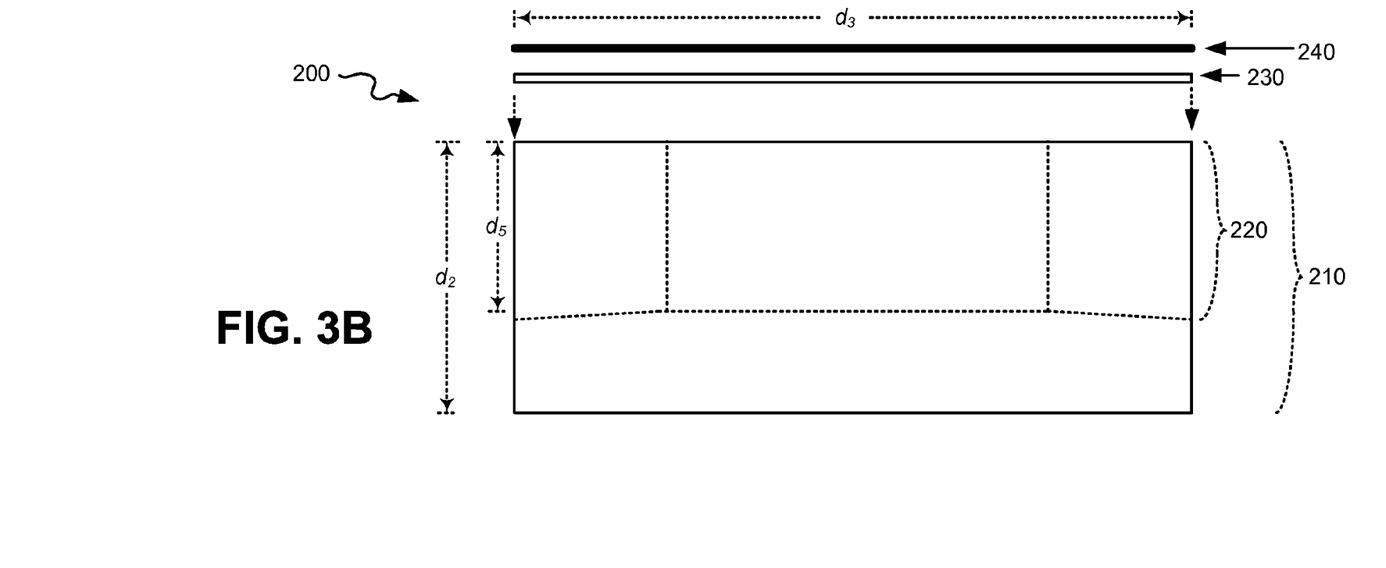
FIG. 3B is a diagram that depicts a view along a length of the ferrule sleeve of FIG. 2.

FIGS. 2, 3A and 3B depict a ferrule sleeve 200 according to a first exemplary embodiment described herein. As shown in FIG. 2, ferrule sleeve 200 may include a sleeve body 210, having a V-shaped groove 220 disposed on an upper surface of sleeve body 210, a sleeve cover 230, and a cover spring 240. Sleeve body 210 may include a longitudinal member that has a V-shaped lower surface, and a V-shaped upper surface that serves as the V-shaped groove 220 which receives cylindrical ferrules of optical cable connectors (as described further below). V-shaped groove 220 may, as shown in FIG. 2, open outwards slightly at each end of ferrule sleeve 200 to more easily permit ferrules to be inserted into each end of V-shaped groove 220. Therefore, in the implementation shown in FIG. 2, a cross section of ferrule sleeve 200 taken towards each outer end of V-shaped groove 200 will have a larger V-shape than a cross section of ferrule sleeve 200 taken towards a middle of V-shaped groove 200. Though not depicted in FIG. 2, outer edges of the V-shaped upper surface of V-shaped groove 200 (i.e., edges disposed along each of the faces of ferrule sleeve 210) may be slightly rounded to facilitate ease of insertion of ferrules (not shown) into V-shaped groove 220.

Sleeve cover 230 may include a longitudinal member that has a flat, rectangular shape. Sleeve body 210 and sleeve cover 230 may be formed from a ceramic or polymer material. Sleeve body 210 and sleeve cover 230 may be formed from a same material, or from different materials. As shown in FIG. 2, sleeve cover 230 may be inserted into (and retained within) an opening of V-shaped groove 220 to place ferrule sleeve 200 in a closed configuration and firmly hold cylindrical ferrules (not shown) placed within V-shaped groove 220. A cover spring 240 may be inserted within retaining slots (not shown in FIG. 2) within the opening of V-shaped groove 220, adjacent to sleeve cover 230, to hold sleeve cover 230 in the closed configuration and to apply downwards force upon sleeve cover 230 so as to firmly hold the cylindrical ferrules (not shown) inserted within V-shaped groove 220. Cover spring 240 may include a metal material formed in a single flat plane in a shape that gives cover spring 240 spring-like properties when inserted into the opening of V-shaped groove 220. In some implementations, cover spring 240 may have a different shape than that shown in FIG. 2 as long as cover spring 240 functions to apply force to sleeve cover 230 within the upper opening of V-shaped groove 220.

FIG. 3A depicts a view of a face of ferrule sleeve 200, and FIG. 3B depicts a view along a length of ferrule sleeve 200. As shown in FIGS. 3A and 3B, sleeve body 210 of ferrule sleeve 200 may have a width of $d_1$, a height of $d_2$ and a length of $d_3$. V-shaped groove 220 of sleeve body 210 may have an opening width $d_4$ of the upper portion of V-shaped groove 220 and a depth of $d_5$ (i.e., to the bottom of the trough of V-shaped groove 220) at a mid-point along a length of ferrule sleeve 200. In an implementation in which V-shaped groove 220 opens slightly at each end of V-shaped groove 220 (as shown in FIGS. 2, 3A and 3B), width $d_4$ and depth $d_5$ may be slightly larger at each outer end of V-shaped groove 220. As depicted in FIG. 3A, each lower surface of sleeve body 210 may have an angle θ relative to a plane that is perpendicular to a center-line plane that bisects V-shaped groove 220. Each lower surface of sleeve body 210 and the inner surface of V-shaped groove 220, thus, has an angle 90-θ relative to the center-line plane that bisects V-shaped groove 220. Sleeve body 210 has a thickness, from the lower surface of sleeve body 210 to the inner surface of V-shaped groove 220 (as measured from an upper surface of sleeve body 210), of $d_6$. As further shown in FIGS. 3A and 3B, sleeve cover 230 may have a width $d_4$ and a length $d_3$. Specific values for the dimensions $d_1$, $d_2$, $d_3$, $d_4$, $d_5$ and $d_6$ and angle θ may be selected to precisely fit an outer diameter and a length of the cylindrical ferrules that are to be inserted into V-shaped groove 220 of sleeve body 210 such that, when sleeve cover 230 and cover spring 240 are inserted into the opening of V-shaped groove 220, sleeve cover 230, cover spring 240 and V-shaped groove 220 hold the ferrules firmly so that they don't move in a lengthwise direction and don't rotate. Therefore, the specific values for the dimensions $d_1$, $d_2$, $d_3$, $d_4$, $d_5$ and $d_6$ and angle θ may vary depending on the size of the ferrules that are to be inserted into ferrule sleeve 200.

Figure 4:
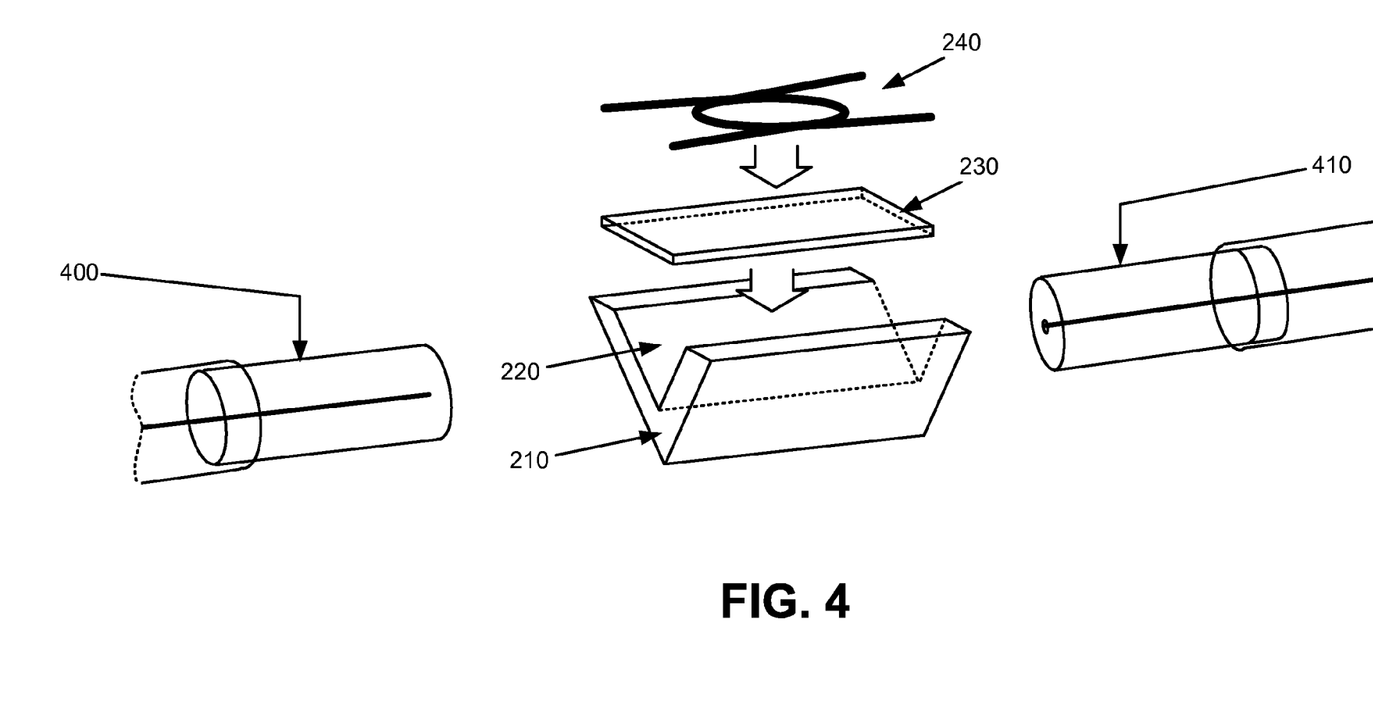
FIGS. 4, 5, 6A, 6B and 6C are diagrams that depict placement of ferrules associated with optic cables into the ferrule sleeve of FIGS. 2, 3A and 3B.
Figure 5:
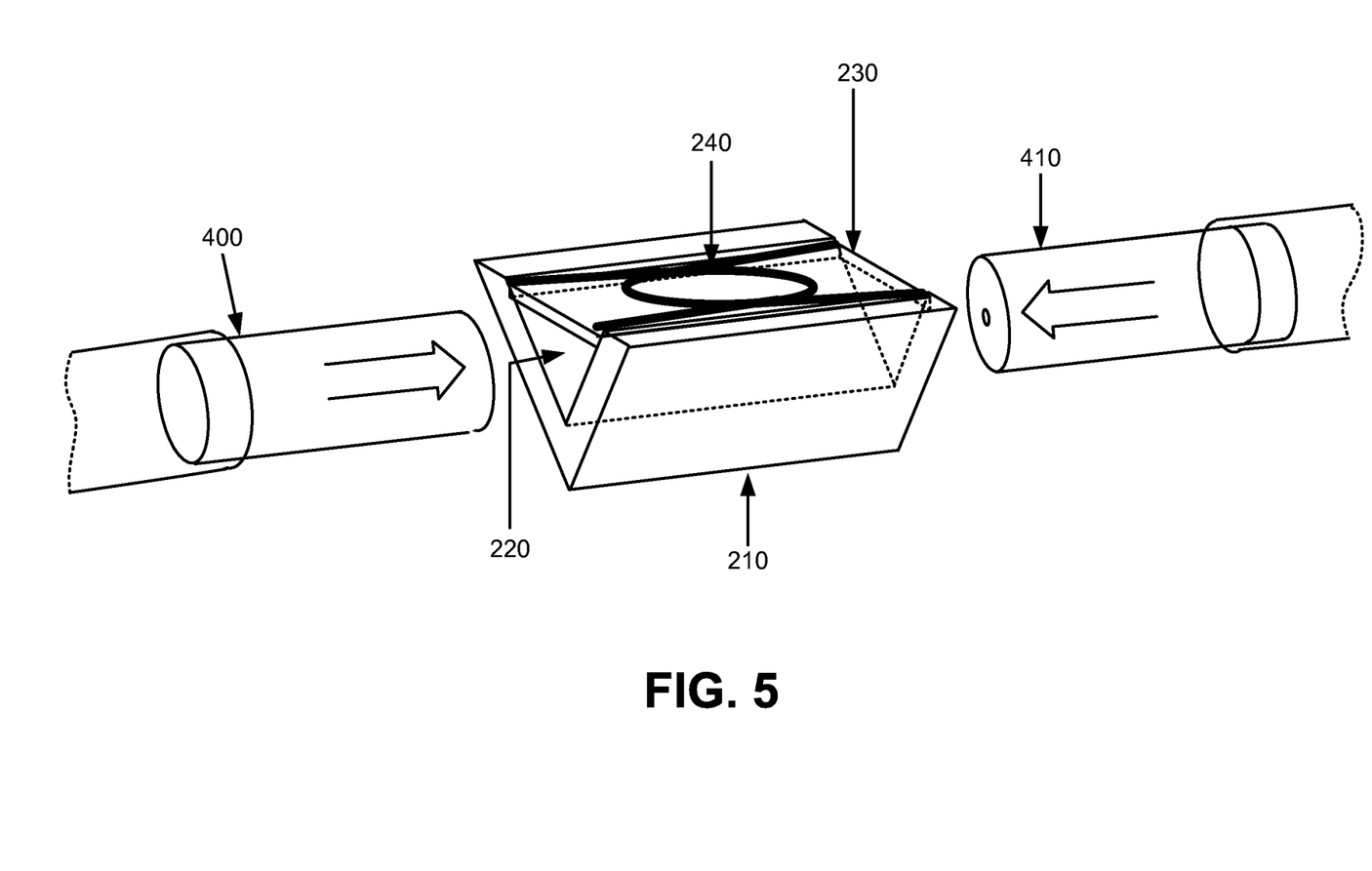
Figure 6A:
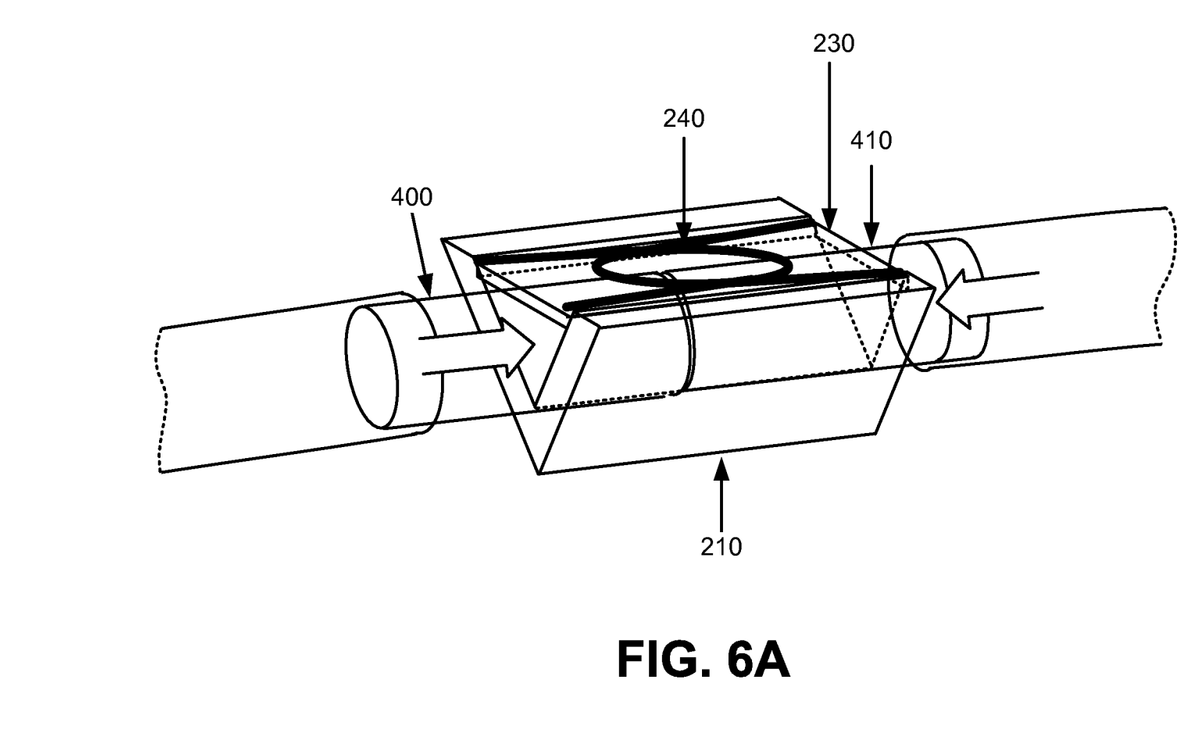

FIGS. 4, 5, 6A, 6B and 6C depict placement of ferrules associated with optic cables into ferrule sleeve 200. As shown in FIG. 4, prior to insertion of ferrules 400 and 410 into ferrule sleeve 210, sleeve cover 230 may be inserted (i.e., snapped into place) into retention slots (not shown) in an upper opening of V-shaped groove 220, and cover spring 240 may also be inserted into the retention slots (shown in FIGS. 6B and 6C) within the upper opening of V-shaped groove 220 against sleeve cover 230. Once sleeve cover 230 and cover spring 240 have been inserted into V-shaped groove 220 to close ferrule sleeve 200 (FIG. 5), ferrule 400 and ferrule 410 may be slid into each opposite end of V-shaped groove 220, as shown in FIG. 6A, until the end faces of ferrules 400 and 410 abut one another and are mated. Abutting the end faces of ferrules 400 and 410 creates an optical connection between the optical fibers running through ferrules 400 and 410 (not shown in FIG. 6A).

Figure 6B:
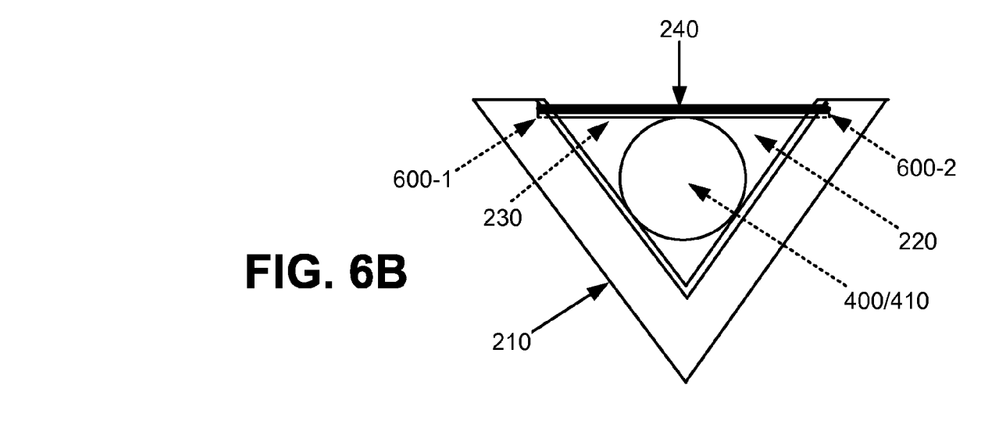
Figure 6C:
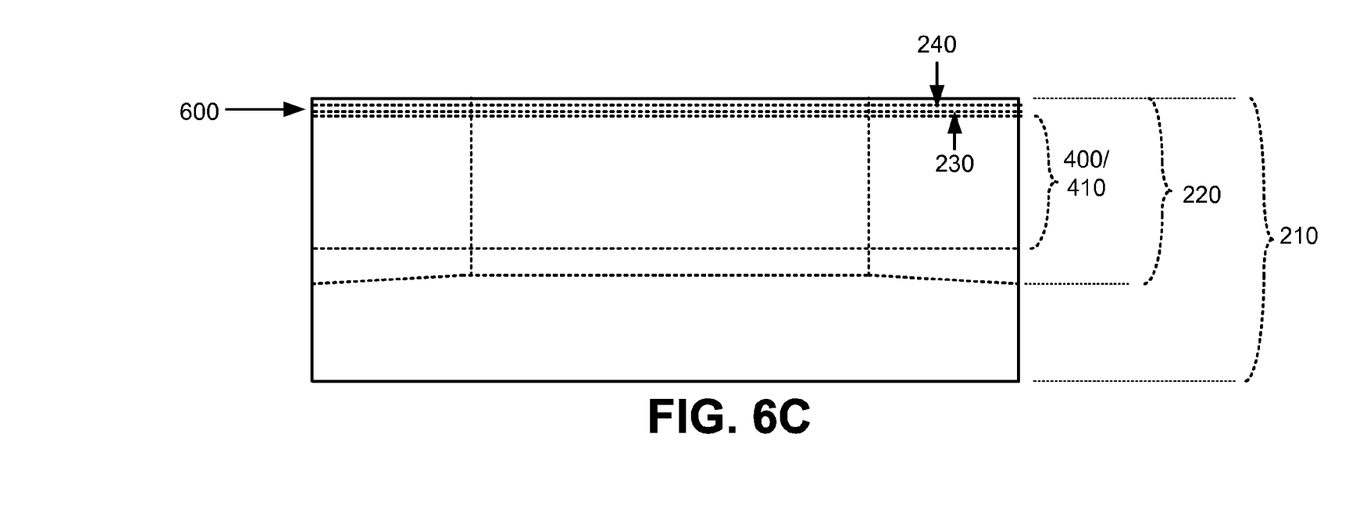

FIGS. 6A, 6B and 6C depict ferrules 400 and 410 completely slid into V-shaped groove 220, with sleeve cover 230 and cover spring 240 inserted into retention slots 600-1 and 600-2 (shown in FIGS. 6B and 6C) on each side of the upper opening of V-shaped groove 220. Insertion of cover spring 240 into retention slots 600-1 and 600-2 against an upper surface of sleeve cover 230 applies force onto sleeve cover 230 such that sleeve cover 230 is held firmly against an upper surface of ferrules 400 and 410 that are inserted into V-shaped groove 220 of ferrule sleeve 200. The force applied by cover spring 240 against sleeve cover 230 prevents lengthwise movement and rotation of ferrules 400 and 410. Prevention of movement and rotation of ferrules 400 and 410 maintains physical contact between the end faces of ferrules 400 and 410 and also maintains accurate alignment (i.e., core-to-core alignment) of the fiber running through ferrules 400 and 410.

Figure 7A:
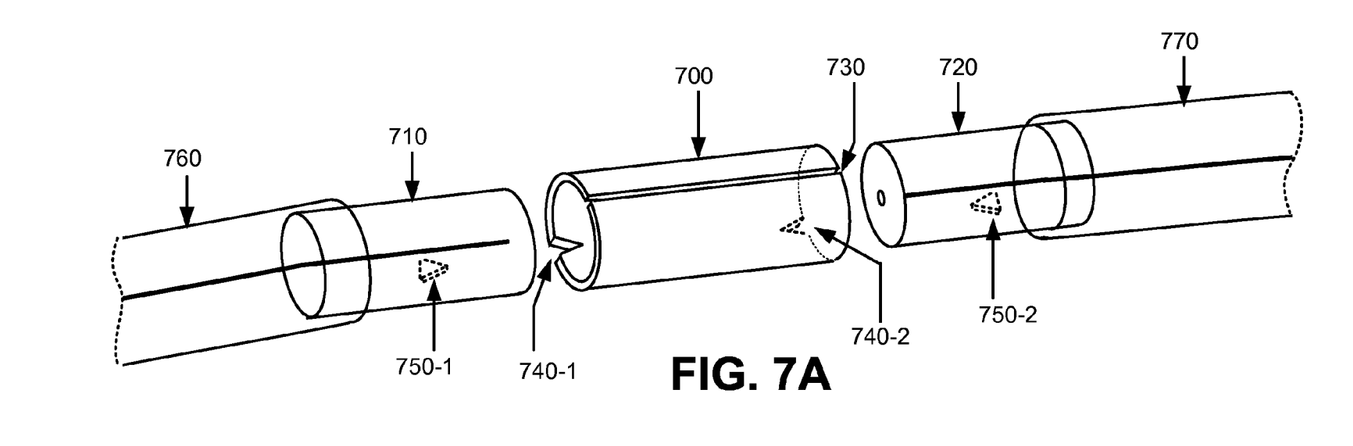
FIGS. 7A, 7B and 7C are diagrams that depict views of a ferrule sleeve according to a second exemplary embodiment.
Figure 7B:
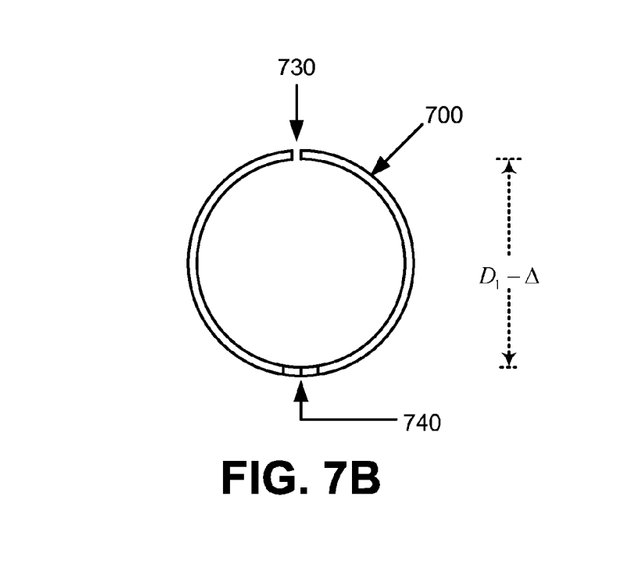
Figure 7C:
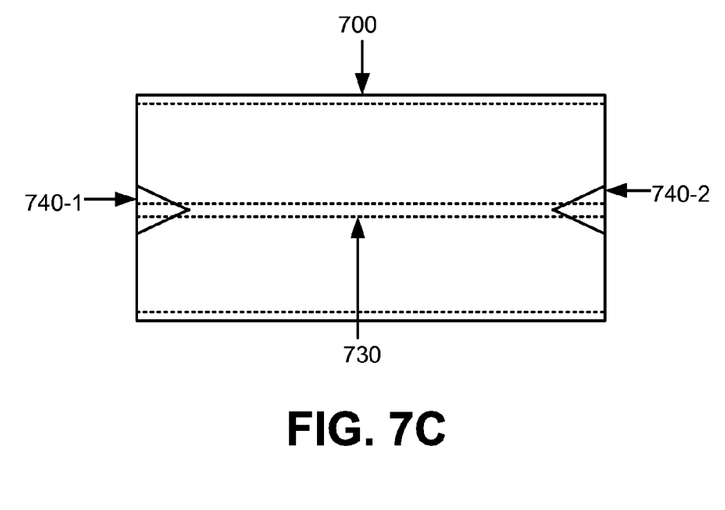

FIGS. 7A, 7B and 7C are diagrams that depict views of a ferrule sleeve according to a second exemplary embodiment. The embodiment of FIGS. 7A, 7B and 7C includes a cylindrical ferrule sleeve 700 having key notches at each opposite end of ferrule sleeve 700 for engagement with corresponding keys disposed on ferrules to be inserted into ferrule sleeve 700, or disposed in a cable housing (not shown) associated with the optic fiber cable that are terminated by the ferrules to be inserted into ferrule sleeve 700. Ferrule sleeve 700 may be formed from a flexible, or semi-flexible, material, such as, for example, a ceramic or a polymer (e.g., composite polymer) material. Ferrules 710 and 720 may each have an outer diameter $D_1$. Ferrule sleeve 700 may have a cut 730 that extends lengthwise across an entire length of ferrule sleeve 700 and may have an inner diameter of $D_1$-Δ (i.e., where Δ is a small value such that the inner diameter of ferrule sleeve 700 is slightly smaller than the outer diameter $D_1$ of ferrules 710 and 720). Cut 730 permits ferrule sleeve 700 to "flex" slightly outwards and/or inwards such that, with inner diameter of ferrule sleeve 700 being slightly smaller than the outer diameter of ferrules 710 and 720, insertion of ferrules 710 and 720 within ferrule sleeve 700 causes ferrule sleeve 700 to "grip" the outer surfaces of ferrules 710 and 720.

Ferrule sleeve 700 may further include key notches 740-1 and 740-2 disposed at each end of ferrule sleeve 700. As shown in the implementation depicted in FIGS. 7A, 7B and 7C, key notches 740-1 and 740-2 may include triangular shaped key notches. In other implementations, other shapes (e.g., rectangular key notches) may alternatively be used. Key notches 740-1 and 740-2 may have a size and shape that match corresponding keys 750-1 and 750-2 disposed on the outer surfaces of ferrules 710 and 720 (as depicted in FIGS. 7A-7C), or disposed in cable housings (not shown) associated with each of the optic fiber cables 760 and 770 that are terminated by ferrules 710 and 720.

Figure 8A:
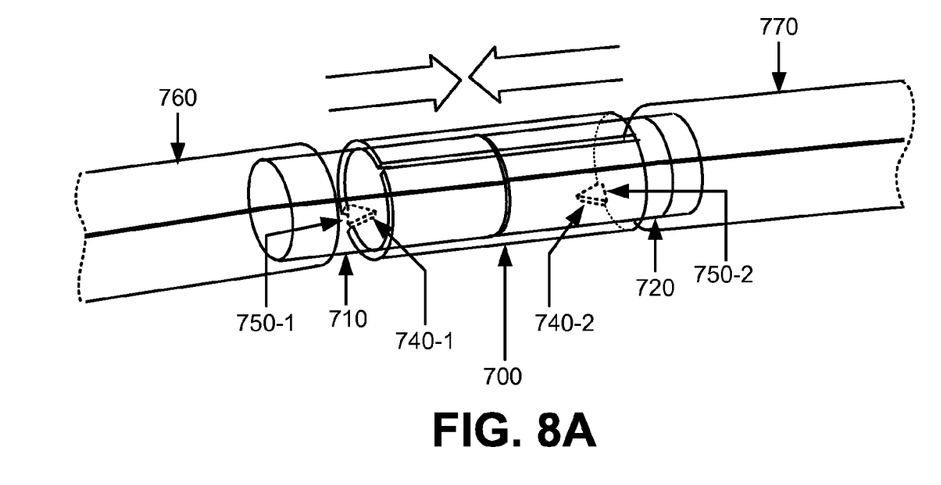
FIGS. 8A and 8B are diagrams that depict placement of ferrules associated with optic cables into the ferrule sleeve of the embodiment of FIGS. 7A, 7B and 7C.
Figure 8B:
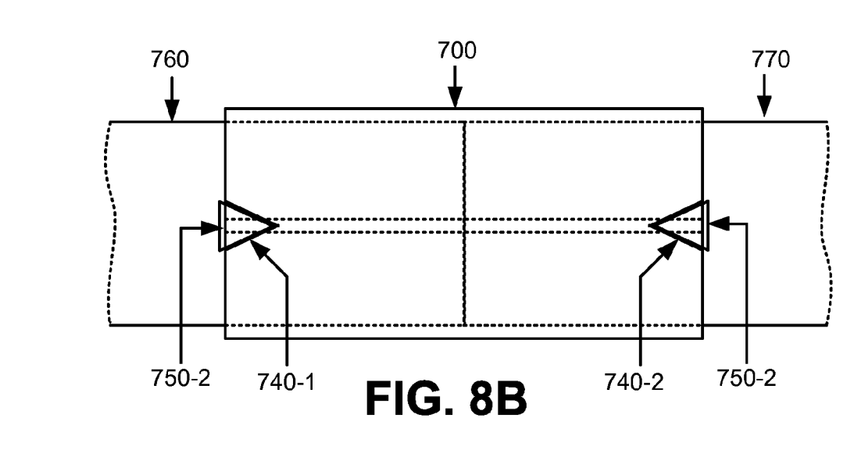

FIGS. 8A and 8B are diagrams that depict placement of ferrules associated with optic cables into the ferrule sleeve of the embodiment of FIGS. 7A, 7B and 7C. As shown, ferrule 710 may be slid into one end of ferrule sleeve 700, and ferrule 720 may be slid into an opposite end of ferrule sleeve 700. End faces of each of ferrules 710 and 720 may abut one another when key 750-1 mates with key notch 740-1 and key 750-2 mates with key notch 740-2. The mating of key 750-1 with key notch 740-1 and key 750-2 with key notch 740-2 holds ferrules 710 and 720 in place such that ferrules 710 and 720 cannot rotate with respect to one another. Additionally, the flexing of ferrule sleeve 700, with the inner diameter of ferrule sleeve 700 being slightly smaller than the outer diameter of ferrules 710 and 720, enables ferrule sleeve 700 to grip the outer surfaces of ferrules 710 and 720, thereby inhibiting lengthwise movement of ferrules 710 and 720 within ferrule sleeve 700. Prevention of lengthwise movement, and rotation, of ferrules 710 and 720 maintains physical contact between the end faces of ferrules 710 and 720 and also maintains accurate alignment (i.e., core-to-core alignment) of the fibers running through ferrules 710 and 720.

The foregoing description of implementations provides illustration and description, but is not intended to be exhaustive or to limit the invention to the precise form disclosed. Modifications and variations are possible in light of the above teachings or may be acquired from practice of the invention. No element used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A ferrule sleeve, comprising:
   a longitudinal ferrule sleeve body having a V-shaped cross-section with a V-shaped upper surface and a V-shaped lower surface, wherein the V-shaped upper surface comprises a V-shaped groove that runs a length of the longitudinal ferrule sleeve body, wherein the V-shaped groove receives cylindrical ferrules, wherein the V-shaped groove has an upper opening at a top of the V-shaped groove and a trough at a bottom of the V-shaped groove, and wherein, when the cylindrical ferrules to be received within the V-shaped groove, rest upon the V-shaped upper surface of the V-shaped groove, an outside diameter of the cylindrical ferrules fits within the V-shaped groove such that an outer surface associated with the outside diameter of the cylindrical ferrules does not extend above the upper opening of the V-shaped groove; and
   a longitudinal ferrule sleeve cover that fits within the V-shaped groove, at the top of the V-shaped groove, as a cover of the V-shaped groove, wherein the longitudinal ferrule sleeve cover has a flat, rectangular shape.

2. The ferrule sleeve of claim 1, further comprising:
   a spring that fits within the V-shaped groove against the longitudinal ferrule sleeve cover.

3. The ferrule sleeve of claim 1, wherein the longitudinal ferrule sleeve body and the longitudinal ferrule sleeve cover comprise a polymer or ceramic material.

4. The ferrule sleeve of claim 1, further comprising:
   retention slots, formed within a first upper portion and a second upper portion of the V-shaped upper surface of the V-shaped groove, configured to receive the longitudinal ferrule sleeve cover within the retention slots.

5. The ferrule sleeve of claim 2, wherein, when a first cylindrical ferrule of the cylindrical ferrules is inserted within the V-shaped groove, the longitudinal ferrule sleeve cover and the spring, inserted into an upper portion of the V-shaped groove, act to hold the first cylindrical ferrule in place, preventing the first cylindrical ferrule from moving or rotating within the V-shaped groove.

6. The ferrule sleeve of claim 5, wherein, when a second cylindrical ferrule of the cylindrical ferrules is placed within the V-shaped groove, the longitudinal ferrule sleeve cover and the spring, inserted into the upper portion of the V-shaped groove, act to hold the first and second cylindrical ferrules in place so as to prevent the first cylindrical ferrule and the second cylindrical ferrule from rotating, or from moving in a longitudinal direction, with respect to one another within the V-shaped groove.

7. The ferrule sleeve of claim 1, wherein the ferrule sleeve comprises a mating sleeve for mating optic fibers contained within the cylindrical ferrules.

8. The ferrule sleeve of claim 1, wherein the cylindrical ferrules connect to cables that carry one or more optic fibers.

9. A ferrule sleeve, comprising:
   a ferrule sleeve body, wherein the ferrule sleeve body includes a V-shaped groove that runs a length of the ferrule sleeve body;
   a ferrule sleeve cover, having a flat, rectangular shape, that fits into an opening of the V-shaped groove of the ferrule sleeve body, and
   a cover spring that fits into the opening of the V-shaped groove of the ferrule sleeve body adjacent the ferrule sleeve cover,
   wherein the ferrule sleeve cover and the cover spring, when a first cylindrical ferrule is inserted within the V-shaped groove, act to hold the first cylindrical ferrule within the V-shaped groove and prevent the first cylindrical ferrule from rotating, or from moving in a longitudinal direction, within the V-shaped groove, and
   wherein, when the first cylindrical ferrule is inserted within the V-shaped groove and rests upon an upper surface of the V-shaped groove, an outside diameter of the first cylindrical ferrule fits within the V-shaped groove such that an outer surface associated with the outside diameter of the first cylindrical ferrule does not extend above the upper opening of the V-shaped groove.

10. The ferrule sleeve of claim 9, wherein the ferrule sleeve cover and the cover spring, when a second cylindrical ferrule is inserted within the V-shaped groove adjacent the first cylindrical ferrule, act to hold the first cylindrical ferrule and the second cylindrical ferrule and prevent the first cylindrical ferrule and the second cylindrical ferrule from rotating, or from moving in a longitudinal direction, with respect to one another within the V-shaped groove.

11. The ferrule sleeve of claim 10, wherein the ferrule sleeve comprises a mating sleeve for mating optic fibers contained within the first and second cylindrical ferrules.

12. The ferrule sleeve of claim 10, wherein the ferrule sleeve body extends a length in a longitudinal direction sufficient to fit a portion of the first cylindrical ferrule and a portion of the second cylindrical ferrule within the V-shaped groove.

13. The ferrule sleeve of claim 9, wherein the opening of the V-shaped groove comprises a first upper portion and a second upper portion of an upper surface of the V-shaped groove, and further comprising:
    retention slots, formed within the first upper portion and the second upper portion of the V-shaped groove, into which the ferrule sleeve cover and the cover spring are inserted.

14. The ferrule sleeve of claim 9, wherein the first cylindrical ferrule connects to a cable that carries one or more optic fibers.

15. The ferrule sleeve of claim 4, wherein the longitudinal ferrule sleeve cover snaps into the retention slots, in the first upper portion and the second upper portion of the V-shaped upper surface of the V-shaped groove, to cover the upper opening of the V-shaped groove.

16. The ferrule sleeve of claim 6, wherein the longitudinal ferrule sleeve body extends a length in a longitudinal direction sufficient to fit a portion of the first cylindrical ferrule and a portion of the second cylindrical ferrule within the V-shaped groove.

17. The ferrule sleeve of claim 9, wherein the ferrule sleeve body has a V-shaped cross-section with a V-shaped upper surface and a V-shaped lower surface.

18. A ferrule sleeve, comprising:
    a ferrule sleeve body that includes a V-shaped groove which runs a length of the ferrule sleeve body, wherein the ferrule sleeve body has a V-shaped cross-section with a V-shaped upper surface and a V-shaped lower surface;

a ferrule sleeve cover, having a flat, rectangular shape, that fits into an opening of the V-shaped groove of the ferrule sleeve body, and a cover spring that fits into the opening of the V-shaped groove of the ferrule sleeve body adjacent the ferrule sleeve cover, wherein the opening of the V-shaped groove comprises a first upper portion and a second upper portion of the V-shaped upper surface of the V-shaped groove, and wherein the ferrule sleeve body includes retention slots, formed within the first upper portion and the second upper portion of the V-shaped upper surface of the V-shaped groove, configured to receive the ferrule sleeve cover and the cover spring within the retention slots, wherein the ferrule sleeve cover and the cover spring, when a first cylindrical ferrule is inserted at a first end within the V-shaped groove and when a second cylindrical ferrule is inserted at a second end within the V-shaped groove adjacent to the first cylindrical ferrule, act to hold the first cylindrical ferrule and the second cylindrical ferrule and prevent the first cylindrical ferrule and the second cylindrical ferrule from rotating, or from moving in a longitudinal direction within the V-shaped groove, with respect to one another, and wherein, when the first cylindrical ferrule and the second cylindrical ferrule are inserted within the V-shaped groove and rest upon the V-shaped upper surface of the V-shaped groove, an outside diameter of the first cylindrical ferrule and the second cylindrical ferrule fits within the V-shaped groove such that an outer surface associated with the outside diameter of the first cylindrical ferrule and the second cylindrical ferrule does not extend above the upper opening of the V-shaped groove.

19. The ferrule sleeve of claim 18, wherein the ferrule sleeve cover snaps into the retention slots, in the first upper portion and the second upper portion of the V-shaped upper surface of the V-shaped groove, to cover the opening of the V-shaped groove.

20. The ferrule sleeve of claim 18, wherein the ferrule sleeve body extends a length in a longitudinal direction sufficient to fit a portion of the first cylindrical ferrule and a portion of the second cylindrical ferrule within the V-shaped groove and wherein the ferrule sleeve acts as a mating sleeve for mating optic fibers contained within the first and second cylindrical ferrules.

* * * * *